US009986580B2

(12) United States Patent
Leung et al.

(10) Patent No.: US 9,986,580 B2
(45) Date of Patent: May 29, 2018

(54) DYNAMIC FREQUENCY AND POWER RESOURCE ALLOCATION WITH GRANULAR POLICY MANAGEMENT

(71) Applicant: EMPIRE TECHNOLOGY DEVELOPMENT LLC, Wilmington (DE)

(72) Inventors: Henry Leung, Alberta (CA); Xiaoxiang Liu, Alberta (CA)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days. days.

(21) Appl. No.: 15/024,040

(22) PCT Filed: Oct. 16, 2013

(86) PCT No.: PCT/US2013/065200
§ 371 (c)(1),
(2) Date: Mar. 23, 2016

(87) PCT Pub. No.: WO2015/057212
PCT Pub. Date: Apr. 23, 2015

(65) Prior Publication Data
US 2016/0212758 A1    Jul. 21, 2016

(51) Int. Cl.
*H04W 72/10*    (2009.01)
*G06Q 10/00*    (2012.01)
(Continued)

(52) U.S. Cl.
CPC ............ *H04W 72/10* (2013.01); *G06Q 10/00* (2013.01); *H04W 28/16* (2013.01);
(Continued)

(58) Field of Classification Search
CPC . H04L 65/80; H04L 41/5003; H04L 41/5006; H04L 67/322; H04W 24/02
See application file for complete search history.

(56) References Cited

U.S. PATENT DOCUMENTS 8,724,799 B2 *    5/2014    Dortschy ................ 375/346
9,461,886 B2 *    10/2016    Racz .................. H04L 41/044
(Continued)

FOREIGN PATENT DOCUMENTS

EP    2389034 A1    11/2011
WO    2012055449 A1    5/2012
WO    2012139664 A1    10/2012

OTHER PUBLICATIONS

Extended European Search Report for European Application No. 13895694.1 dated May 22, 2017, pp. 10.
(Continued)

*Primary Examiner* — Chandrahas B Patel

(57) ABSTRACT

Technologies are generally described to provide multi-objective dynamic resource optimization for self-organizing networks. In some examples, a system employing dynamic resource optimization may allocate network resources to a group of subscribers to enable granular policy management per cell, per subscriber type, per service, and/or per user resource. The dynamic resource optimization may be based on optimization/improvement of a throughput objective and a quality of experience (QoE) objective. Users maybe segmented into different groups according to subscriber types with each group having a priority level assigned. Resources may be allocated first to a highest or relatively higher priority group of users, and remaining resources may be consecutively allocated to lower priority groups. The QoE objective may be quantitatively determined by mapping real time quality of service (QoS) parameters associated with the
(Continued)

subscriber group. A set of group policy parameters may also be applied to weight the throughput and QoE objectives.

23 Claims, 8 Drawing Sheets

(51) Int. Cl.
| | |
|---|---|
| *H04W 28/16* | (2009.01) |
| *H04W 72/04* | (2009.01) |
| *H04W 24/02* | (2009.01) |
| *H04W 84/18* | (2009.01) |

(52) U.S. Cl.
CPC ... *H04W 72/0453* (2013.01); *H04W 72/0473* (2013.01); *H04W 24/02* (2013.01); *H04W 84/18* (2013.01)

(56) References Cited

U.S. PATENT DOCUMENTS

| | | |
|---|---|---|
| 2010/0159976 A1 | 6/2010 | Marocchi et al. |
| 2011/0158184 A1 | 6/2011 | Agulnik et al. |
| 2012/0264470 A1 | 10/2012 | Bajj et al. |
| 2012/0320766 A1 | 12/2012 | Sridhar |
| 2013/0122884 A1 | 5/2013 | Saito |

OTHER PUBLICATIONS

Ali, S.H., and Leung, V.C.M., "Dynamic Frequency Allocation in Fractional Frequency Reused OFDMA Networks," IEEE Transaction on Wireless Communications, vol. 8, Issue 8, pp. 4286-4295 (Aug. 2009).

Fiedler, M., et al., "A generic quantitative relationship between quality of experience and quality of service," IEEE Network, vol. 24, Issue 2, pp. 36-41 (Mar.-Apr. 2010).

International Search Report with written opinion for International Application No. PCT/US2013/065200 dated Feb. 10, 2014.

Khan, S., et al., "MOS-Based Multiuser Multiapplication Cross-Layer Optimization for Mobile Multimedia Communication," Advances in Multimedia, vol. 2007, pp. 11 (2007).

Litiu, R., and Prakash, A., "Individual and Group QoS Issues in Communication Services for Groupware Systems," pp. 1-14 (1997).

Rev, D., "Quality of service (QoS) and Policy Management in Mobile Data Networks," IXIA, pp. 1-23 (Jul. 2011).

Sharma, N., and Anupama, K. R.,"On the use of NSGA-II for multi-objective resource allocation in MIMO-OFDMA systems," Wireless Networks, vol. 17, Issue 5, pp. 1191-1201 (Jul. 2011).

Soldani, D., "Bridging QoE and QoS for Mobile Broadband Networks," World Class Standards QoS QoE User Experience Workshop, pp. 45 (Sep. 21-22, 2010).

Sridhar, K., "Extended SON Essential for Optimized LTE Networks," Techzine, accessed on https://web.archive.org/web/20121106052725/http://www2.alcatel-lucent.com/blogs/techzine/2011/extended-son-essential-for-optimized-lte-networks/, Jul. 18, 2011, pp. 5.

Thakolsri, S., "Quality of Experience based Network Resource Allocation for Wireless Multimedia Delivery," Technische Universitat M Unche, PhD Thesis, pp. 130 (May 2012).

* cited by examiner

DYNAMIC FREQUENCY AND POWER RESOURCE ALLOCATION WITH GRANULAR POLICY MANAGEMENT

CROSS-REFERENCE TO RELATED APPLICATION

This Application is the U.S. National Stage filing under 35 U.S.C. § 371 of International Application No. PCT/US13/65200, filed on Oct. 16, 2013. The International Application is herein incorporated by reference in its entirety.

BACKGROUND

Unless otherwise indicated herein, the materials described in this section are not prior art to the claims in this application and are not admitted to be prior art by inclusion in this section.

Dynamic resource allocation for allocating network resources to groups of subscribers within a self-organizing network (SON) may be modeled by employing throughput optimization in order to increase a quality of experience (QoE) of subscribers. Throughput may include a capacity or total data rate provided to a subscriber or group of subscribers over a network. Some example dynamic resource allocation plans may optimize frequency and power of allocated resources while taking into account a quality of service (QoS) parameter such as a minimum bit rate requirement. While taking the minimum bit rate requirement into account to increase a total throughput for a group of subscribers, conventional resource allocations may not consider additional QoS parameters such as packet delay budget, packet error loss rate, and data rate. Additionally, individual subscribers may not be differentiated according to subscriber types and services, or applications in use.

SUMMARY

The present disclosure generally describes techniques for dynamic frequency and power resource allocation towards Quality of Experience (QoE) optimization or otherwise improved QoE for granular policy management.

According to some examples, the present disclosure describes methods for frequency and power resource allocation in a self-organizing network (SON). An example method may segment subscribers into a plurality of groups based on subscriber types. The method may additionally assign a priority level to each group of subscribers. The method may also optimize the resources of the SON considering a group of subscribers with the highest priority. The method may further assign the optimized resources to the group of subscribers having the highest priority. The method may further optimize and assign the remaining resources of the SON to one or more groups of subscribers with the lower priorities than the group with the highest priority. Optimization of the resources within each group of subscribers may be modeled as a multi-objective optimization based on a total throughput of each group of subscribers and a quality of experience (QoE) of each subscriber in the group of subscribers.

According to some examples, the present disclosure describes a self-organizing network (SON) controller for frequency and power resource allocation. The SON controller may include a memory configured to store instructions. The SON controller may additionally include a processing module coupled to the memory. The processing module may be configured to execute a resource allocation application in conjunction with the instructions stored in the memory. The resource allocation application may be configured to segment subscribers into a plurality of groups based on the subscriber types. The resource allocation application may also assign a priority level to each group of subscribers. The resource allocation application may additionally optimize resources of the SON, considering a group of subscribers with the highest priority, and assign the optimized resources to the group of subscribers having the highest priority. The resource allocation application may optimize and assign the remaining resources of the SON to one or more groups of subscribers with lower priorities than the group with the highest priority. Optimization of the resources within each group of subscribers may be modeled as a multi-objective optimization based on a total throughput of each group of subscribers and a quality of experience (QoE) of each subscriber in the group of subscribers.

According to some examples, the present disclosure describes a self-organizing network (SON) with Quality of Experience (QoE) based dynamic frequency and power resource allocation. The SON may include a base station configured to facilitate wireless communication with one or more subscriber devices. The SON may include at least one server that may be communicatively coupled with a base station, which may be configured to manage SON operations. The server may be configured to segment subscribers into a plurality of groups based on subscriber types. The server may also assign a priority level to each group of subscribers. The server may generate a QoE objective function for each group of subscribers based on a QoE of each subscriber within the group of subscribers. The server may additionally generate a total throughput objective function for each group of subscribers based on a total throughput of each group of subscribers. The server may combine the total throughput objective function and the QoE objective function as an aggregate objective function (AOF). The server may generate a resource allocation plan to optimize resources of the SON based on the AOF. The server may also assign the optimized resources of the SON to a first group of subscribers with a first priority level. The server may assign remaining resources to one or more second groups of subscribers with second priority levels that may be lower, relative to the first priority level.

According to some examples, the present disclosure describes a non-transitory computer readable storage medium with instructions stored thereon. In response to execution on one or more computing devices, non-transitory computer readable storage medium may perform or may cause to perform a method for frequency and power resource allocation in a self-organizing network (SON) as described herein.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
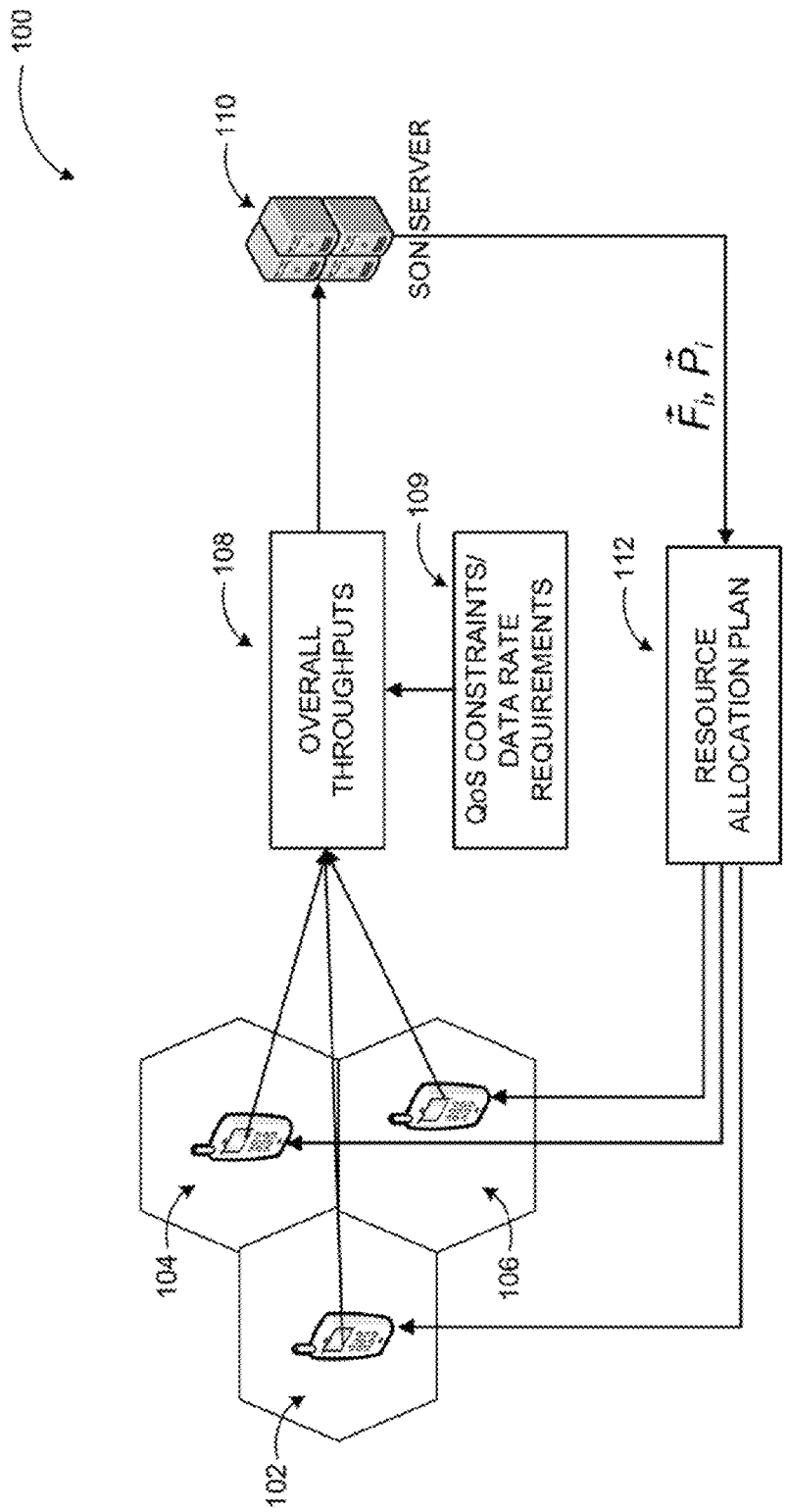
FIG. 1 illustrates an example of how dynamic resource allocation may be addressed as an optimization approach in self-organization networks (SONs)

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to dynamic frequency and power resource allocation towards Quality of Experience (QoE) optimization or otherwise improved QoE for granular policy management.

Briefly stated, technologies are generally described to provide multi-objective dynamic resource optimization/improvement for self-organizing networks. In some examples, a system employing dynamic resource optimization/improvement may allocate network resources to a group of subscribers to enable granular policy management per cell, per subscriber type, per service, and per user resource. The dynamic resource optimization may be based on optimization or otherwise improvement of a throughput objective and a QoE objective. Users maybe segmented into different groups according to subscriber types with each group having a priority level assigned. Resources may be allocated first to a highest priority group of users, and remaining resources may be consecutively allocated to lower priority groups. The QoE objective may be quantitatively determined by mapping real time quality of service (QoS) parameters associated with the subscriber group. A set of group policy parameters may also be applied to weight the throughput and QoE objectives.

FIG. 1 illustrates an example of how dynamic resource allocation may be addressed as an optimization approach in self-organization networks (SONs), arranged in accordance with at least some embodiments as described herein.

Dynamic resource allocation may be modeled as an optimization problem as illustrated in a diagram 100. One purpose of dynamic resource allocation may be to dynamically search for a set of sub-carrier frequencies and transmit power pairs to increase overall throughputs 108 for a total number of concurrent users 102, 104, 106, while satisfying or at least adequately servicing each individual user's data rate requirements (QoS constraints and data rate requirements 109). The total throughput 108 or network capacity may be defined as the total data rate across the network for the total number of concurrent users.

A QoS profile may be associated with each user 102, 104, 106, and the QoS profile may define a set of parameters or requirements to be provided by the network (QoS constraints and data rate requirements 109), including a minimum bit rates, packet delay tolerance, acceptable packet loss rates, and/or other parameters. One of the constraints for maximizing or otherwise increasing the overall throughputs 108 may be specified as the individual user's data rate exceeding a minimum bit rate requirement or other particular bit rate from the user's QoS profile. A resource allocation plan 112 may be generated by a SON server 110 to optimize/improve frequency and power of the resources while taking into account the QoS parameter constraints such as each user's minimum bit rate requirement. The resource allocation plan 112 may be scheduled to each user across the network. The sub-carrier frequencies and power may be linked to the users' data rate via a signal-to-interference plus noise ratio (SINR) such that real-time network conditions for each user may also be incorporated in an optimization framework for dynamic resource allocation.

The throughput based resource allocation plan 112 demonstrated in diagram 100, however, may be insufficient for evolving self-organizing networks (SONs) with increasing complexities in which granular policy management and control is useful to support availability and QoE for different services. The dynamic resource allocation plan 112 may increase the throughput based on optimized frequency and power, however the dynamic resource allocation plan 112 may not differentiate individual users 102, 104, 106 according to other factors such as subscriber types and services, or applications associated with each individual user.

For example, a data-cap subscription plan provided by a service provider may differentiate users based on a data cap such that after data usage exceeds the cap, a user's QoS may be degraded. Each subscriber may have a same minimum bit rate throughput requirement, and the throughput based dynamic optimization may take into account the prescribed minimum bit rates as the constraint for the resource optimization. As a result, the scheduled resources according to the optimization plan may have no differentiation between subscriber types regardless of the data-cap subscription plan. In another example, services or applications in use may also affect the user's experience. Some services, such as video and gaming applications, may be sensitive to QoS parameters such as latency and packet loss, in addition to the minimum bit rate requirement. The throughput based dynamic optimization may consider the prescribed minimum bit rate constraint, and may lead to improved performance for applications which may be insensitive to latency and packet loss, such as internet and peer-to-peer service, while video, gaming and enterprise services may experience a non-ideal resource allocation resulting in a degraded QoE for users.

A system according to some example embodiments may address the above-discussed concerns by providing a cascade-layered framework of dynamic frequency and power resource allocation and thereby enabling granular policy control and management. The resource allocation plan may first segment users into different groups according to their subscriber types with each having a priority label assigned. The total resources may be optimized or otherwise tailored first to the group of users with relatively higher priority and then the remaining resources may be assigned to the group(s) of users with lower priorities in order of priority.

Figure 2:
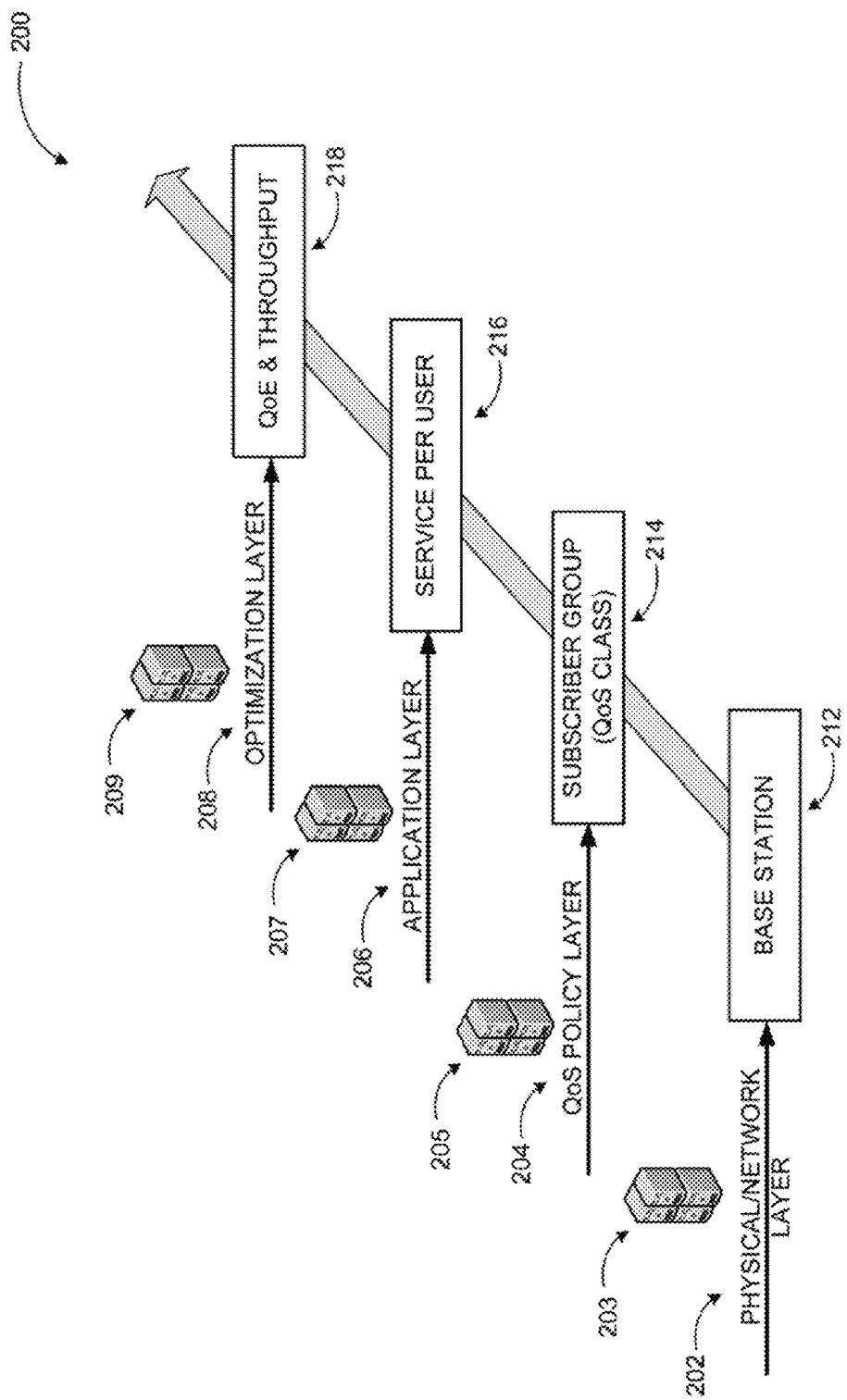
FIG. 2 illustrates an example layered optimization framework, where embodiments may be implemented.

FIG. 2 illustrates an example layered optimization framework, where embodiments may be implemented, arranged in accordance with at least some embodiments as described herein.

As illustrated in a diagram 200, a dynamic resource allocation plan, according to some embodiments, may provide a cascade layered framework of dynamic frequency and power resource allocation for SON networks, including a long term evolution (LTE) network, an Evolved Universal Mobile Telecommunication System Terrestrial Radio Access Network (EUTRAN) network, an LTE-Advanced network, and other networks, thereby enabling granular policy control and management. An example network may include multiple base stations within multiple cells, multiple concurrent users geologically distributed among different cells, and one or more SON servers that collectively determine real-time parameters or key performance indicators (KPIs) from users' devices and base stations. In a system according to embodiments, an optimization process for dynamic resource allocation may be realized in a layered optimization framework to enable granular policy management per cell, per subscriber type, per service and per user resource optimization. The optimized/improved dynamic resource allocation may be based on optimization/enhancement of two objectives: a total throughput objective and a quality of experience (QoE) objective.

The dynamic resource optimization may begin at a physical/network layer 202 including one or more base stations 212 or cells and a number of users associated with each base station. A fixed amount of resources (for example, subcarrier frequencies and power) may be first scheduled by one or more servers 203 in order to limit or otherwise reduce the overall resources for a total number of base stations in a region of interest. In physical/network layer 202, various frequency reuse schemes may be realized. For example, a fractional frequency reuse scheme of statistically or dynamically portioning the base stations 212 into different geographical regions may be carried out by the one or more servers 203.

After scheduling the resources at the physical/network layer 202, the resources may be further scheduled in a QoS policy layer 204. In the QoS policy layer 204, users may be segmented into different subscriber groups 214 according to a group policy by one or more servers 205. The group policy may be a predefined or dynamically determined. Example subscriber groups may be unaffiliated casual subscribers and corporate subscribers. Each of the segmented subscriber groups 214 may be assigned a priority level, and the dynamic resource optimization may be first applied to a subscriber group with highest or otherwise relatively higher priority according to the group policy by the servers 205. After the resources are optimized and assigned to the subscriber group with the highest priority, remaining resources may then be allocated consecutively to the groups of subscribers with lower priorities by the servers 205.

Additionally, for each subscriber group, the resources may be optimized at an application layer 206 by one or more servers 207 based upon application types employed by each user (service per user 216) within each group of subscribers. In the application layer 206, services-related QoS parameters may be monitored by the servers 207 for optimization/improvement purposes. The QoS parameters in the application layer may include, but are not limited to, service start-up time, service retainability, accessibility, jitter, authentication, authorization, coverage area, response time, error rate, latency and codec delay/type, to name a few.

In a further embodiment, a multi-objective optimization may be performed at a user optimization layer 208 by one or more servers 209 to improve a QoE objective for each individual user within a group of subscribers and a total throughput objective for each group of subscribers. The multi-objective optimization may be based on input from the QoS policy layer 204 and the application layer 206. The QoS policy layer 204 may specify a set of parameters for each subscriber group according to the group policy. For example, certain subscriber groups may prefer a higher QoE satisfaction rather than throughput maximization/increase. Multi-objective optimization parameters for each subscriber group may be used to weigh the two objectives during optimization. The application layer 206 may provide the application-associated QoS parameters for each subscriber, which may be employed to map QoS metrics to QoE metrics in the multi-objective optimization function.

The one or more servers 203, 205, 207, and 209 may be separate servers performing various management tasks centrally or in a distributed manner at each level. Some or all of the one or more servers 203, 205, 207, and 209 may also be combined for example as a SON server. The servers may be embodied as dedicated computing devices communicatively coupled to base stations and other components of the SON. Some of all of the servers may also be embodied in one or more network components, for example, as part of some base stations.

Figure 3:
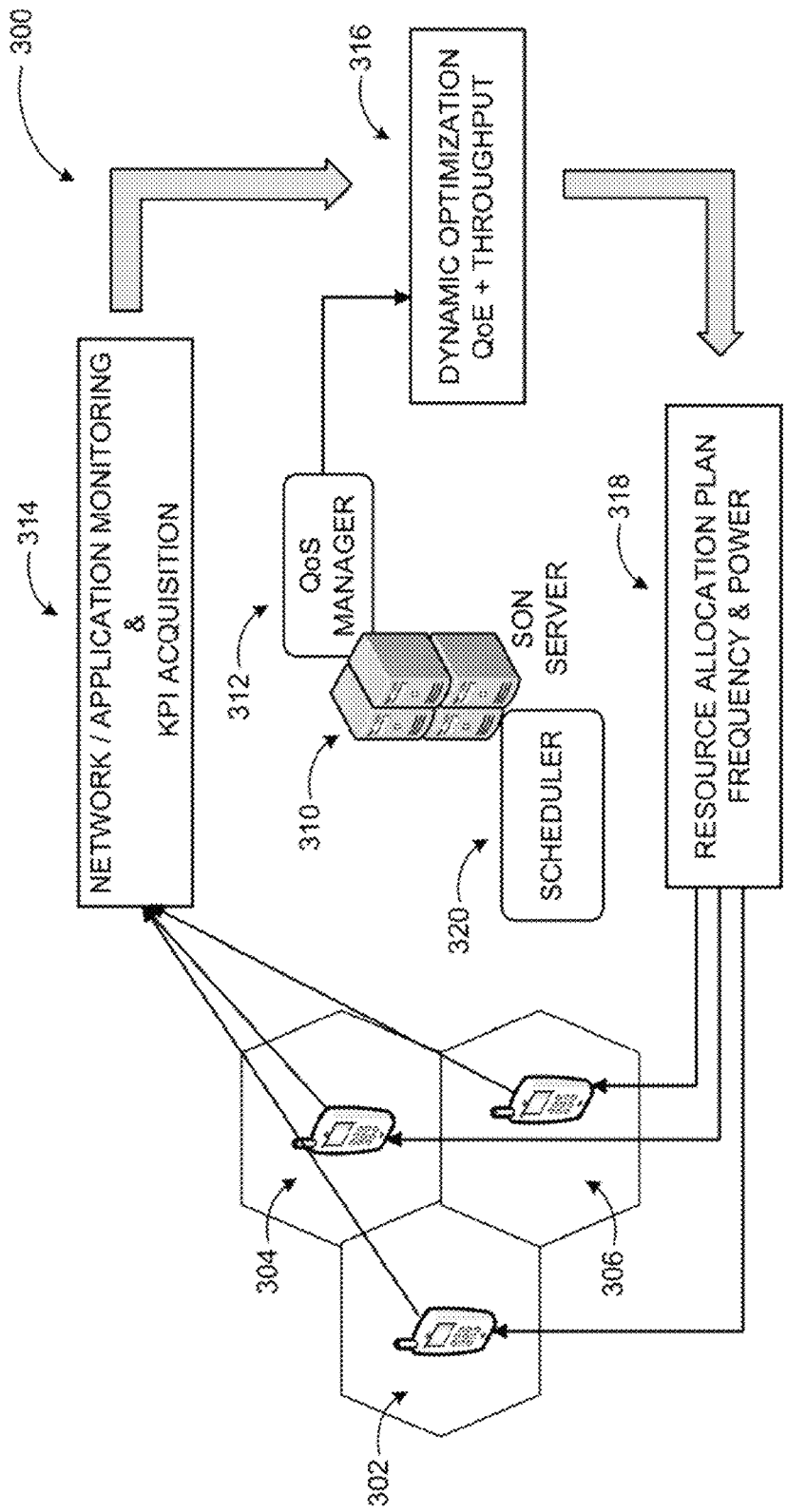
FIG. 3 illustrates example building blocks in an SON server for resource allocation.

FIG. 3 illustrates example building blocks in an SON server for resource allocation, arranged in accordance with at least some embodiments as described herein.

As described above, a multi-objective optimization may be performed to provide dynamic resource optimization based on cell, subscriber type, service, and user resources. As illustrated in diagram 300, dynamic resource optimization 316 may be executed at a self-organizing network server 310. In the context of dynamic resource optimization, policy management may be a primary function for the SON server 310, which may allow service providers to granularly control an availability and QoE of different services associated with the SON server 310. Server and group policies may be employed to allocate network resources dynamically based on parameters defined by the policies. Moreover, resources may be optimized/tailored in the dynamic resource optimization 316 by the SON server 310 taking into consideration the QoE and throughput objectives. A QoS manager 312 associated with the SON server 310 may provide policy rules to control priority parameters for assigning a priority level to each group of subscribers 302, 304, 306. The QoS manager 312 may also provide QoS constraints associated with each group of subscribers, including for example, packet delay, and the acceptable loss of data packets for various types of services associated with each group of subscribers.

In an example embodiment, the dynamic resource optimization 316 may provide per cell, per subscriber type, per service and per user allocation of the resources based on real-time estimation of channel conditions, such as actual co-channel interference based upon path loss characteristics and throughput demand of active mobile devices in real time. A network/application monitoring and KPI acquisition 314 block may perform real-time monitoring and acquisition of KPIs for subscriber groups. The network/application monitoring and KPI acquisition 314 block may provide the KPIs and QoS parameters in order to provide real-time channel conditions for the dynamic resource optimization. The real-time monitoring by the network/application monitoring and KPI acquisition 314 block may be carried out at multiple levels including a service level, a system level and a network level. Example QoS parameters at the service level for a video application may include video frame rate, response time, peak signal to noise ratio (PSNR), and other parameters. At the system and network level, the parameters obtained may include the burst delay, gap density, packet loss, bandwidth, video bit rate, instantaneous throughput speed, and other parameters.

In an example embodiment, outputs of the dynamic resource optimization 316 may include resource allocation plans 318 for each group of subscribers, each base station or cell associated with a group of subscribers, and each subscriber within the group of subscribers. Each resource allocation plan 318 may be applied to each subscriber by a scheduler 320 associated with the SON server 310. The scheduler 320 may allocate the corresponding resources according to the resource allocation plan 318 associated with each group of subscribers.

Figure 4:
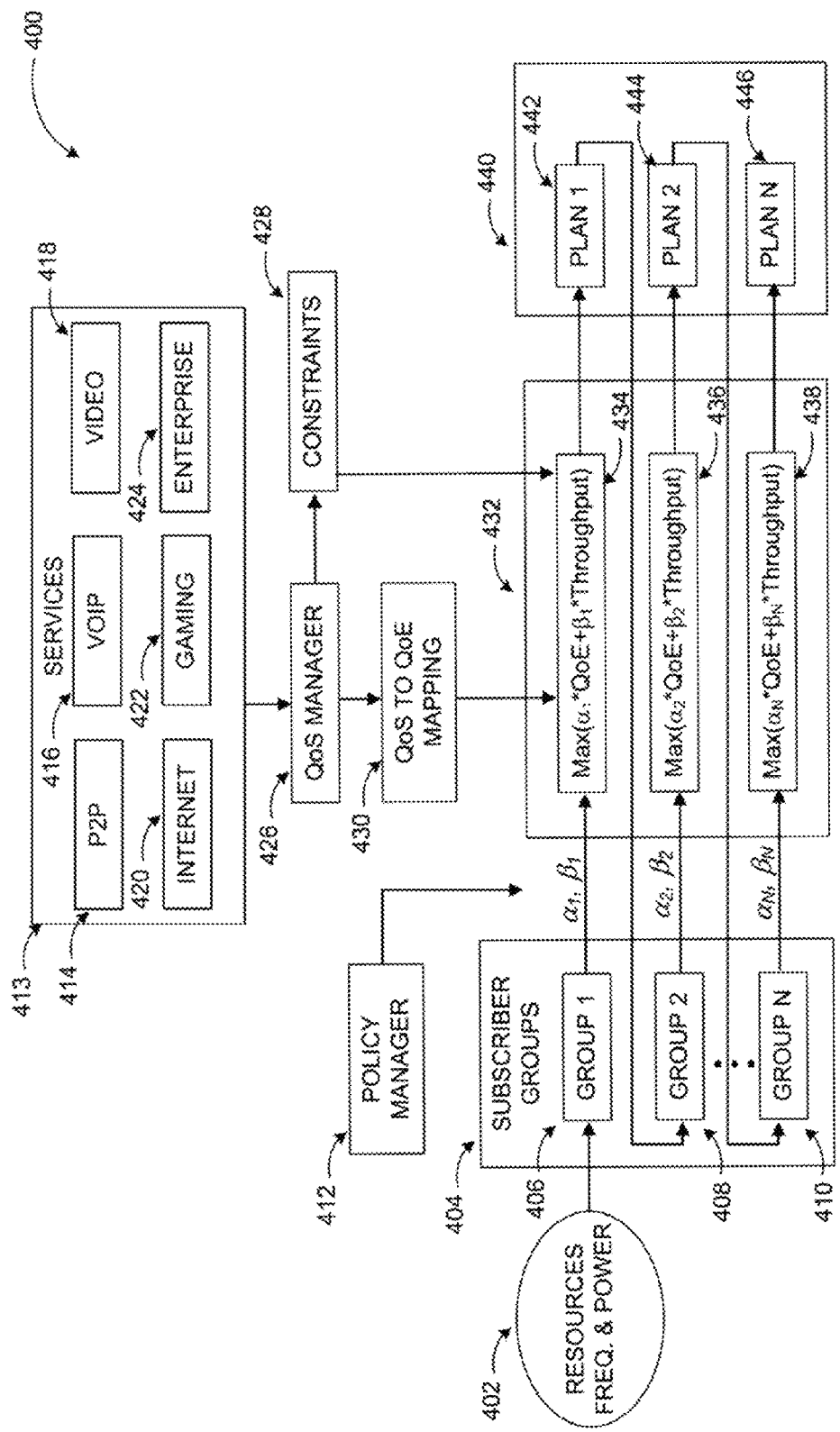
FIG. 4 illustrates an example multi-layer, multi-objective dynamic frequency and power resource optimization.

FIG. 4 illustrates an example multi-layer, multi-objective dynamic frequency and power resource optimization, arranged in accordance with at least some embodiments as described herein.

In a system according to embodiments, a dynamic resource optimization may be a multi-objective optimization process based on a QoE objective and a throughput objective. As illustrated in a diagram 400, the dynamic resource optimization and allocation process may involve QoS-to-QoE mapping and dynamic optimization per subscriber group based upon a group policy.

In an example embodiment, resources 402, including frequency and transmitted power, may be provided to groups of subscribers 404 based on one or more resource allocation plans 440. Each resource allocation plan (442, 444, 446) may schedule a portion of optimized resources to be provided to a subscriber group (406, 408, 410) based on a priority level of the subscriber group. Additionally, each resource allocation plan (442, 444, 446) may be based on group policies associated with each subscriber group and a determined QoE associated with each subscriber group. Group policies may be provided to the dynamic resource optimization 432 by a policy manager 412, which may provide network constraints and parameters associated with a particular subscriber group, such as cell information, data plan, and subscriber type.

In an example embodiment, QoE may be a performance indicator that ties together user perception, experience, and expectations in terms of usability, accessibility, retain ability and integrity of service. QoE may also be influenced by the services 413 or applications currently used by a subscriber. Example services 413 may include peer-to-peer 414 services, voice over internet protocol (VOIP) 416 services, video 418, internet 420, gaming 422, enterprise 424, and other applications executed by a subscriber on a client device over a network. QoEs for each service may not be quantifiably measured since QoE is related to a subscriber's subjective perception of service. In order to quantify the QoE for subscriber services, the QoE may be expressed by QoS parameters employing QoS-to-QoE mapping 430. A QoS manager 426 may perform real-time monitoring of network conditions and services that subscribers are using and may acquire KPIs for the services 413. QoS parameters may be obtained for each subscriber in the group of subscribers based on the KPIs and the service associated with each subscriber. Example QoS parameters may include service dependent parameters including packet delay budget, packet error loss rate, data rate, or other parameters.

The QoS manager 426 may facilitate the QoS-to-QoE mapping 430 employing the obtained QoS parameters in a service based mapping equation. As an illustrative example, the service based mapping equation may be expressed as:

$$QoE = \alpha \operatorname{Exp}(-\beta QoS) + \gamma,$$

where $\alpha$, $\beta$, and $\gamma$ represent service dependent QoS parameters such as packet delay budget, packet error loss rate, and data rate, and QoS may be a real number representing a defined QoS for a subscriber group based on a determined QoS class or service type. A QoE objective function may then be determined based on the QoS-to-QoE mapping. Table I illustrates example values of QoS parameters for performing QoS-to-QoE mapping employing the obtained QoS parameters in the service based mapping equation.

TABLE 1

Example minimum QoS values for service type

| QoS class | Packet Delay Budget | Packet Error Loss Rate | Data rate | Example Services |
|---|---|---|---|---|
| 1 | 100 ms | $10^{-2}$ | 4-25 kb/s | Conversational voice |
| 2 | 150 ms | $10^{-3}$ | 32-384 kb/s | Conversational video (live streaming) |
| 3 | 50 ms, 250 ms | $10^{-3}$ | 60 kb/s, 30 kb/s | Real time gaming, telemetry |
| 4 | 300 ms | $10^{-6}$ | 20-384 kb/s | Non-Conversational video (buffered streaming) |
| 5 | 100 ms | $10^{-6}$ | 4-13 kb/s | IMS signaling |
| 6 | 300 ms | $10^{-6}$ | <384 kb/s, <128 kb/s | Video (buffered streaming) TCP-based (email, ftp, chat, P2P, file sharing, progressive video) |
| 7 | 100 ms | $10^{-3}$ | 4-13 kb/s, <384 kb/s, <60 kb/s | Voice Video (live streaming) Interactive gaming |
| 8 | 300 ms | $10^{-6}$ | <384 kb/s, <64 kb/s | Video (buffered streaming) TCP-based (email, ftp, chat, P2P, file sharing, progressive video) |

Furthermore, additional constraints 428 such as a minimum (or otherwise sufficient) bit rate requirement constraint for each subscriber within the selected group of subscribers may be obtained to optimize/improve a throughput objective for the group of subscribers. A throughput objective function that enhances a total throughput for a selected group of subscribers may be established based on the minimum bit rate requirements constraint, for example.

In an example embodiment, the determined QoE objective function and the throughput objective function may be combined to provide an aggregate objective function (AOF) for the dynamic resource optimization 432. The AOF may increase the total throughput and the QoE. The AOF may be weighted based on the group policy parameters obtained from the policy manager 412 for each group of subscribers such that each group of subscribers 406, 408, 410 is associated with a distinct AOF (434, 436, 438) based on the group specific polices.

An example AOF function may be a linear weighted sum objective function with weighting parameters obtained from the group policies. Other AOFs may also be employed including a weighted exponential sum method, a lexicographic method, a Tchebycheff method, and comparable approaches. Moreover, a non-dominated sorting genetic algorithm (NSGA) may be applied to the AOF to determine the dynamic resource optimization.

Based on the AOF for the dynamic resource optimization, one or more resource allocation plans 440 may be provided to schedule a portion of optimized resources to be provided to a subscriber group (406, 408, 410) based on a priority level of the subscriber group. The resource optimization may be first carried out to a subscriber group with highest or otherwise relatively higher priority according to the group policy, and remaining resources may then be optimized and allocated consecutively to the groups of subscribers with lower priorities.

Figure 5:
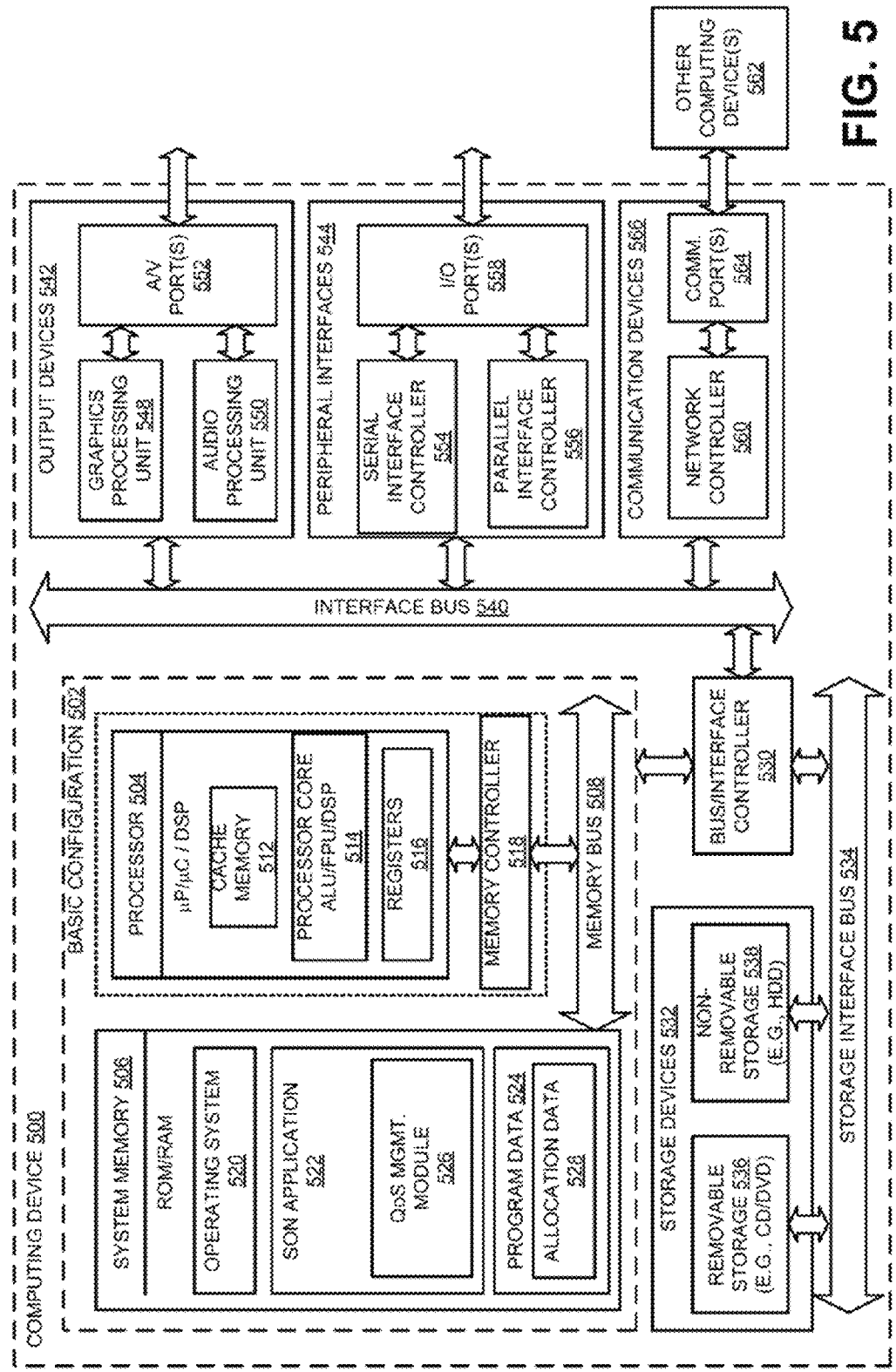
FIG. 5 illustrates a general purpose computing device, which may be used for multi-layer, multi-objective dynamic frequency and power resource optimization.

FIG. 5 illustrates a general purpose computing device, which may be used for multi-layer, multi-objective dynamic frequency and power resource optimization, arranged in accordance with at least some embodiments as described herein.

For example, the computing device 500 may be used as a server, desktop computer, portable computer, smart phone, special purpose computer, or similar device. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one more levels of caching, such as a level cache memory 512, one or more processor cores 514, and registers 516. The example processor cores 514 may (each) include an arithmetic logic unit (ALU), a floating point unit (FPU), a digital signal processing core (DSP Core), or any combination thereof. An example memory controller 518 may also be used with the processor 504, or in some implementations, the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, an SON application 522, and program data 524. The SON application 522 may include a QoS management module 526, which may be an integral part of the application 522 or a separate application on its own. The QoS management module 526 may facilitate real-time monitoring of network conditions and services executed by subscribers, and may obtain QoS parameters for performing QoS-to-QoE mapping, as described herein. The program data 524 may include, among other data, allocation data 528 related to dynamically allocating resources to groups of subscribers based on a resource allocation plan, taking into account a QoE objective and a total throughput objective, or others, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, DVDs, SSDs, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (for example, one or more output devices 542, one or more peripheral interfaces 544, and one or more communication devices 566) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (for example, keyboard, mouse, pen, voice input device, touch input device, etc.) or other peripheral devices (for example, printer, scanner, etc.) via one or more I/O ports 558. An example communication device 566 includes a network controller 550, which may be arranged to facilitate communications with one or more other computing devices 562 over a network communication link via one or more communication ports 564. The one or more other computing devices 562 may include servers, client devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 6A:
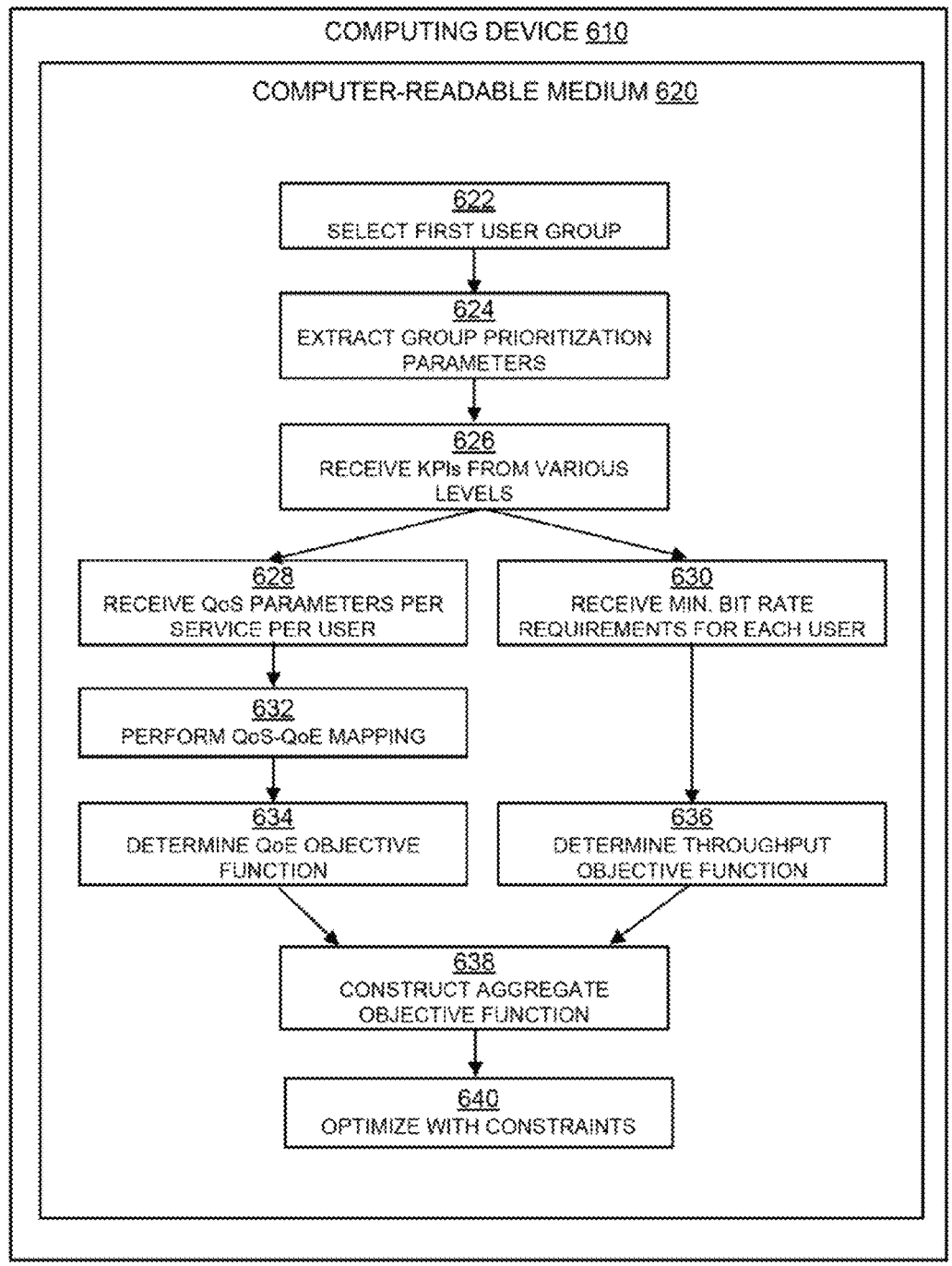
FIGS. 6A and 6B show a flow diagram illustrating an example method for dynamic frequency and power resource allocation towards Quality of Experience (QoE) optimization for granular policy management that may be performed by a computing device such as the computing device in FIG. 5.
Figure 6B:
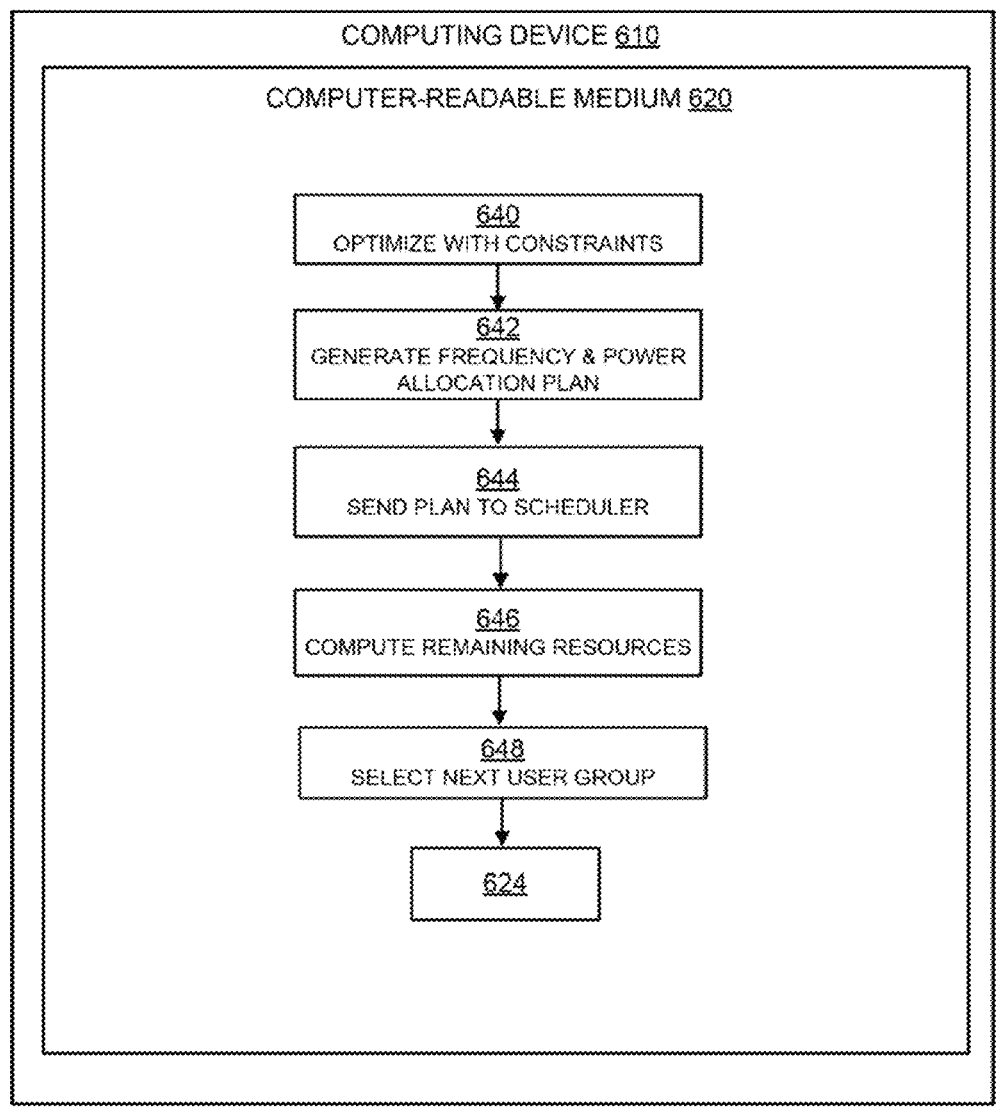

FIGS. 6A and 6B show a flow diagram illustrating an example method for dynamic frequency and power resource allocation towards Quality of Experience (QoE) optimization for granular policy management that may be performed by a computing device such as the computing device in FIG. 5, arranged in accordance with at least some embodiments as described herein.

Example methods may include one or more operations, functions or actions as illustrated by one or more of blocks 622, 624, 626, 628, 630, 632, 634, 636, 638, 640, 642, 644, 646, and/or 648. The operations described in the blocks 622 through 648 may be performed in response to execution (such as by one or more processors described herein) of computer-executable instructions stored in a computer-readable medium, such as a computer-readable medium 620 of a computing device 610.

An example process for dynamic frequency and power resource allocation towards Quality of Experience (QoE) optimization for granular policy management may begin with block 622, "SELECT A FIRST USER GROUP," where a first group of subscribers within a network is selected for optimizing resource allocation by a management server, for example, the SON server 310.

Block 622 may be followed by block 624, "EXTRACT GROUP PRIORITIZATION PARAMETERS," where a priority level of the group of subscribers is extracted to identify the highest priority group.

Block 624 may be followed by block 626, "RECEIVE KPIs FROM VARIOUS LEVELS," where network conditions and applications the subscribers in the group are currently using may be monitored by the SON server 310 by gathering key performance indicators (KPIs) from the network.

Block 626 may be followed by block 628 and block 630. At block 630, "RECEIVE MINIMUM BIT RATE REQUIREMENTS FOR EACH USER," a throughput objective for the group of subscribers may be determined by the SON server 310 based on a minimum bit rate requirement constraint for each subscriber within the selected group of subscribers. Block 630 may be followed by block 636, "ESTABLISH THROUGHPUT OBJECTIVE FUNCTION," where a throughput objective function that increases a total throughput for the selected group of subscribers may be established by the SON server 310 based on the minimum bit rate requirements constraint.

Block 626 may also be followed by block 628, "RECEIVE QoS PARAMETERS PER SERVICE PER USER," where a Quality of Experience objective may be determined by the SON server 310 based on QoS parameters obtained for each subscriber in the group of subscribers based on the service associated with each subscriber. The QoS parameters may be obtained from the obtained KPIs. Block 628 may be followed by block 632, "PERFORM QoS-QoE MAPPING," where a generic mapping equation may be performed by the SON server 310 by the SON server 310 to quantify the QoE based on the obtained QoS parameters. The generic mapping equation may utilize service dependent parameters including packet delay budget, packet error loss rate, and data rate, and the service dependent parameters may be dependent on a QoS class of service.

Block 632 may be followed by block 634, "DETERMINE QoE OBJECTIVE FUNCTION," where a QoE objective function may be determined by the SON server 310 based on the QoS-to-QoE mapping.

Blocks 634 and 636 may be followed by block 638, "CONSTRUCT AGGREGATE OBJECTIVE FUNCTION," where an aggregate objective function for optimizing dynamic resource allocation may be generated by the SON server 310 based on the QoE objective function and the throughput objective function such that the aggregate objective function may increase the total throughput and the QoE.

Block 638 may be followed by block 640, "OPTIMIZE WITH CONSTRAINTS," where the aggregate objective function may be weighted by the SON server 310 with additional network constraints and parameters obtained from a group policy associated with the group of subscribers.

As illustrated in FIG. 6B, Block 640 may be followed by block 642, "GENERATE FREQUENCY AND POWER ALLOCATION PLAN," where a frequency and power allocation plan may be determined by the SON server 310 based on the optimized objective function.

Block 642 may be followed by block 644, "SEND PLAN TO SCHEDULER," where the plan may be sent to a scheduler executed on the SON server 310 for implementing the plan to allocate the resources to the group of subscribers based on the optimized objective function.

Block 644 may be followed by block 646, "COMPUTE REMAINING RESOURCES," where the remaining resources may be determined by the SON server 310 after allocation to the selected group of subscribers.

Block 646 may be followed by block 648, "SELECT NEXT USER GROUP," where a next group of subscribers may be selected by the SON server 310 for allocating a portion of the remaining resources. Block 648 may be followed by block 624 to enable the process to be continuously repeated to optimize and allocate resources to subscribers according to an assigned priority level of the group.

The blocks included in the above-described process are for illustration purposes. Dynamic frequency and power resource allocation towards Quality of Experience (QoE) optimization/improvement for granular policy management may be implemented by similar processes with fewer or additional blocks. In some embodiments, the blocks may be performed in a different order. In some other embodiments, various blocks may be eliminated. In still other embodiments, various blocks may be divided into additional blocks, supplemented with other blocks, or combined together into fewer blocks.

Figure 7:
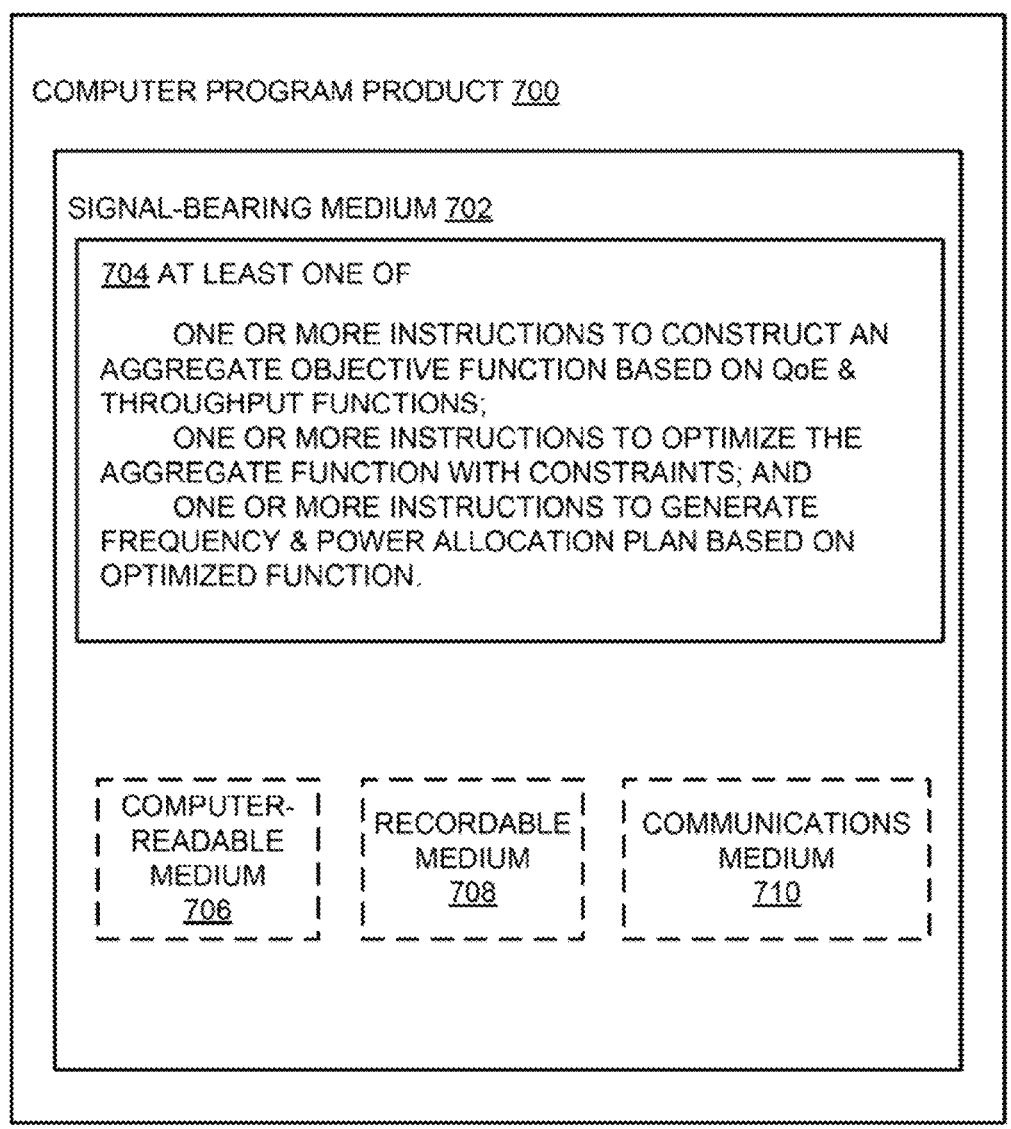
FIG. 7 illustrates a block diagram of an example computer program product, all arranged in accordance with at least some embodiments described herein.

FIG. 7 illustrates a block diagram of an example computer program product, arranged in accordance with at least some embodiments as described herein.

In some embodiments, as shown in FIG. 7, the computer program product 700 may include a signal bearing medium 702 that may also include one or more machine readable instructions 704 that, in response to execution by, for example, a processor, may provide the features and functionality described herein. Thus, for example, referring to the processor 504 in FIG. 5, a QoS management module 526 executed on the processor 504 may undertake one or more of the tasks shown in FIG. 7 in response to the instructions 704 conveyed to the processor 504 by the medium 702 to perform actions associated with dynamic frequency and power resource allocation towards QoE optimization/improvement for granular policy management as described herein. Some of those instructions may include, for example, instructions to construct an aggregate objective function based on QoE and throughput functions, optimize the aggregate function with constraints, and generate a frequency and power allocation plan based on the optimized function, according to some embodiments described herein.

In some implementations, the signal bearing medium 702 depicted in FIG. 7 may encompass a computer-readable medium 706, such as, but not limited to, a hard disk drive, a solid state drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (for example, a fiber optic cable, a waveguide, a wired communications link, a wireless communication link, etc.). Thus, for example, the program product 700 may be conveyed to one or more modules of the processor 504 of FIG. 5 by an RF signal bearing medium, where the signal bearing medium 702 is conveyed by the wireless communications medium 710 (for example, a wireless communications medium conforming with the IEEE 702.11 standard).

According to some examples, the present disclosure describes methods for frequency and power resource allocation in a self-organizing network (SON). An example method may segment subscribers into a plurality of groups based on subscriber types. The method may additionally assign a priority level to each group of subscribers. The method may also optimize the resources of the SON considering a group of subscribers with the highest priority. The method may further assign the optimized resources to the group of subscribers having the highest priority. The method may further optimize and assign the remaining resources of the SON to one or more groups of subscribers with the lower priorities than the group with the highest priority. Optimization of the resources within each group of subscribers may be modeled as a multi-objective optimization based on a total throughput of each group of subscribers and a quality of experience (QoE) of each subscriber in the group of subscribers.

According to an additional example, the method may further include applying a set of parameters to each group to weight the total throughput and QoE objectives. The method may additionally include determining the set of parameters dynamically based on a quality of service (QoS) policy management profile for each group of subscribers.

According to a subsequent example, the method may further include quantitatively constructing the QoE by mapping QoS parameters to QoE parameters. Mapping QoS parameters to QoE parameters may include mapping the QoS parameters to the QoE parameters by employing $QoE = \alpha Exp(-\beta QoS) + \gamma$, where $\alpha$, $\beta$, and $\gamma$ may be service dependent QoS parameters. Service dependent QoS parameters, $\alpha$, $\beta$, and $\gamma$, may represent packet delay budget, packet error loss rate, and data rate, respectively. In some examples, QoS may be a real number representing a determined value for a QoS class of service. The method may further include determining the set of parameters based on collected key performance indicators (KPIs) from subscriber devices and base stations associated with the SON.

According to another example, the method may further include collecting the KPIs and QoS parameters at one or more of a service level, a system level and a network level. Collecting the QoS parameters at the service level may include collecting, for a video application, one or more of a video frame rate, a response time, and a picture signal to noise ratio (PSNR). According to an additional example, collecting the QoS parameters at one or more of the system level and the network level may include collecting, for a video application, one or more of a burst delay, a gap density, a packet loss, a bandwidth, a video bit rate, and an instantaneous throughput speed.

According to some examples, the method may further include combining the total throughput and QoE objectives as an aggregate objective function (AOF). The AOF may be weighted based on parameters obtained from one or more group policies for each group of subscribers. The AOF may include one of a linear weighted sum objective function, a weighted exponential sum function, a lexicographic function, and a Tchebycheff function. The method may further include determining the resource allocation based on applying a non-dominated sorting genetic algorithm (NSGA) to the AOF.

According to another example, the method may further include assigning a priority level to each subscriber and summing the assigned priority levels of each subscriber within each group to obtain the priority level to be assigned to each group. Optimizing the resources of the SON or optimizing the remaining resources of the SON may include scheduling one or more of the sub-carrier frequencies and power levels. Optimizing the resources of the SON or optimizing the remaining resources of the SON may additionally include dynamically portioning a cell surface into distinct geographic regions.

According to some examples, the present disclosure describes a self-organizing network (SON) controller for frequency and power resource allocation. The SON controller may include a memory configured to store instructions. The SON controller may additionally include a processing module coupled to the memory. The processing module may be configured to execute a resource allocation application in conjunction with the instructions stored in the memory. The resource allocation application may be configured to segment subscribers into a plurality of groups based on the subscriber types. The resource allocation application may also assign a priority level to each group of subscribers. The resource allocation application may additionally optimize resources of the SON, considering a group of subscribers with the highest priority, and assign the optimized resources to the group of subscribers having the highest priority. The resource allocation application may optimize and assign the remaining resources of the SON to one or more groups of subscribers with lower priorities than the group with the highest priority. Optimization of the resources within each group of subscribers may be modeled as a multi-objective optimization based on a total throughput of each group of subscribers and a quality of experience (QoE) of each subscriber in the group of subscribers.

According to another example, to optimize the resources of the SON or the remaining resources of the SON, the resource allocation application may be configured to schedule one or more of sub-carrier frequencies and power levels. Additionally, to optimize the resources of the SON or the remaining resources of the SON, the resource allocation application may be further configured to dynamically portion a cell surface into distinct geographic regions.

According to some examples, the resource allocation application may be further configured to apply a set of parameters to each group to weight the total throughput and QoE objectives. The resource allocation application may be further configured to determine the set of parameters dynamically based on a quality of service (QoS) policy management profile for each group.

According to another example, the resource allocation application may be further configured to quantitatively construct the QoE based on a map between QoS parameters and QoE parameters. The map of the QoS parameters to the QoE parameters may be based on $QoE=\alpha Exp(-\beta QoS)+\gamma$, where $\alpha$, $\beta$, $\gamma$ may be service dependent QoS parameters and QoS may be a real number representative of a determined value of a QoS class of service. According to some examples, $\alpha$, $\beta$, and $\gamma$ may represent packet delay budget, packet error loss rate, and data rate, respectively.

According to some additional example, the resource allocation application may be further configured to determine the set of parameters based on collected key performance indicators (KPIs) from subscriber devices and base stations associated with the SON. The resource allocation application may be further configured to collect the KPIs and QoS parameters at one or more of a service level, a system level, and a network level. The QoS parameters collected at the service level for a video application may include one or more of a video frame rate, a response time, and a peak signal to noise ratio (PSNR). The QoS parameters collected at the system level and the network level for a video application may include one or more of a burst delay, a gap density, a packet loss, a bandwidth, a video bit rate, and an instantaneous throughput speed.

According to another example, the resource allocation application may be further configured to combine the total throughput and QoE objectives as an aggregate objective function (AOF). The AOF may be weighted based on parameters obtained from one or more group policies for each group of subscribers. The AOF may include one of a linear weighted sum objective function, a weighted exponential sum function, a lexicographic function, and a Tchebycheff function. The resource allocation application may be further configured to determine the resource allocation based on the application of a non-dominated sorting genetic algorithm (NSGA) to the AOF.

According to some examples, the present disclosure describes a self-organizing network (SON) with Quality of Experience (QoE) based dynamic frequency and power resource allocation. The SON may include a base station configured to facilitate wireless communication with one or more subscriber devices. The SON may include at least one server that may be communicatively coupled with a base station, which may be configured to manage SON operations. The server may be configured to segment subscribers into a plurality of groups based on subscriber types. The server may also assign a priority level to each group of subscribers. The server may generate a QoE objective function for each group of subscribers based on a QoE of each subscriber within the group of subscribers. The server may additionally generate a total throughput objective function for each group of subscribers based on a total throughput of each group of subscribers. The server may combine the total throughput objective function and the QoE objective function as an aggregate objective function (AOF). The server may generate a resource allocation plan to optimize resources of the SON based on the AOF. The server may also assign the optimized resources of the SON to a first group of subscribers with a first priority level. The server may assign remaining resources to one or more second groups of subscribers with second priority levels that may be lower, relative to the first priority level.

According to a further example, to optimize the resources of the SON, the server may be further configured to schedule one or more sub-carrier frequencies and power levels. According to an additional example, to optimize the resources of the SON, the server may be further configured to dynamically portion a cell surface into distinct geographic regions. The at least one server may be further configured to determine a set of parameters dynamically based on a group quality of service (QoS) policy management profile. According to a subsequent example, the at least one server may be further configured to apply the set of parameters to each group to weight the total throughput objective function and the QoE objective function.

According to an additional example, the at least one server may be further configured to quantitatively construct the QoE objective function by mapping QoS parameters to QoE parameters employing $QoE=\alpha Exp(-\beta QoS)+\gamma$, where $\alpha$, $\beta$, and $\gamma$ may be service dependent QoS parameters. In some examples, $\alpha$, $\beta$, and $\gamma$ may represent packet delay budget, packet error loss rate, and data rate, respectively.

According to some examples, the at least one server may be further configured to determine the set of parameters based on collecting key performance indicators (KPIs) from subscriber devices and base stations associated with the SON at one or more of a service level, a system level and a network level. The SON may be one of a long term evolution (LTE) network, an Evolved Universal Mobile Telecommunication System Terrestrial Radio Access Network (EU-TRAN) network, and an LTE-Advanced network.

According to some examples, the present disclosure describes a non-transitory computer readable storage medium with instructions stored thereon. In response to execution on one or more computing devices, non-transitory computer readable storage medium may perform or may cause to perform a method for frequency and power resource allocation in a self-organizing network (SON) as described herein.

Various embodiments may be implemented in hardware, software, or combination of both hardware and software (or other computer-readable instructions stored on a non-transitory computer-readable storage medium and executable by one or more processors); the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (for example, hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (for example, as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (for example, a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (for example, feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a"

and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for frequency and power resource allocation in a self-organizing network (SON) in which subscribers are segmented into a plurality of groups based on subscriber type, the method comprising:
   assigning a priority level to each group of subscribers, wherein priority levels assigned to the subscribers within a group are summed to obtain the priority level assigned to the group;
   optimizing resources of the SON for a group of subscribers with a highest priority level, and assigning the optimized resources to the group of subscribers with the highest priority level; and
   optimizing and assigning remaining resources of the SON to one or more groups of subscribers with lower priority levels than the group with the highest priority level,
   wherein optimization of resources within a particular group of subscribers comprises:
   determining a total throughput objective of the particular group of subscribers; and
   determining a quality of experience (QoE) objective of each subscriber in the particular group of subscribers, wherein determining the QoE objective comprises mapping quality of service (QoS) parameters associated with the particular group of subscribers to QoE parameters associated with each subscriber in the particular group of subscribers, and
   wherein the optimization of resources within the particular group of subscribers is modeled as a multi-objective optimization based on the total throughput objective of the particular group of subscribers and the quality of experience (QoE) objective of each subscriber in the particular group of subscribers.

2. The method of claim 1, further comprising:
   applying a set of parameters to the particular group of subscribers to weight the total throughput objective and the QoE objective.

3. The method of claim 2, further comprising:
   determining the set of parameters dynamically based on a QoS policy management profile for the particular group of subscribers.

4. The method of claim 1, further comprising:
   combining the total throughput objective and the QoE objective as an aggregate objective function (AOF), wherein the AOF is weighted based on parameters obtained from one or more group policies for the particular group of subscribers.

5. The method of claim 1, wherein mapping the QoS parameters to the QoE parameters comprises:
   mapping the QoS parameters to the QoE parameters employing:

$$QoE = \alpha \text{Exp}(-\beta QoS) + \gamma,$$

wherein $\alpha$, $\beta$, and $\gamma$ are service dependent QoS parameters, and QoS is a real number representative of a determined value of a QoS class of service, and wherein $\alpha$, $\beta$, and $\gamma$ represent packet delay budget, packet error loss rate, and data rate, respectively.

6. The method of claim 1, wherein optimizing the resources of the SON or optimizing remaining resources of the SON includes:
   scheduling one or more of sub-carrier frequencies and power levels; and
   dynamically portioning a cell surface into distinct geographic regions.

7. The method of claim 2, further comprising:
   determining the set of parameters based on key performance indicators (KPIs) collected from subscriber devices and base stations associated with the SON.

8. The method of claim 7, further comprising:
   collecting the KPIs and the QoS parameters at one or more of a service level, a system level and a network level, wherein collecting the QoS parameters at the service level for a video application includes collecting one or more of: a video frame rate, a response time, and a peak signal to noise ratio (PSNR), and wherein collecting the QoS parameters at the system level and the network level for the video application includes collecting one or more of: a burst delay, a gap density, a packet loss, a bandwidth, a video bit rate, and an instantaneous throughput speed.

9. A non-transitory computer readable storage medium with instructions stored thereon, which in response to execution by one or more computing devices, perform or cause to be performed the method of claim 1 for frequency and power resource allocation in the SON.

10. A self-organizing network (SON) with quality of experience (QoE) based dynamic frequency and power resource allocation, the SON comprising:
   a base station configured to facilitate wireless communication with one or more subscriber devices; and
   at least one server communicatively coupled with the base station and configured to manage SON operations, wherein subscribers are segmented into a plurality of groups based on subscriber types, and wherein the server is configured to:
   assign a priority level to each group of subscribers;
   generate a QoE objective function for a particular group of subscribers based on a QoE of each subscriber within the particular group of subscribers;
   generate a total throughput objective function for the particular group of subscribers based on a total throughput of the particular group of subscribers;
   combine the total throughput objective function and the QoE objective function as an aggregate objective function (AOF);
   generate a resource allocation plan to optimize resources of the SON based on the AOF via a schedule of one or more of sub-carrier frequencies and power levels and via a cell surface dynamically portioned into distinct geographic regions;
   assign the optimized resources of the SON to a first group of subscribers with a first priority level; and
   assign remaining resources to one or more second groups of subscribers with second priority levels that are lower relative to the first priority level.

11. The SON of claim 10, wherein the at least one server is further configured to:
   determine a set of parameters dynamically based on a group quality of service (QoS) policy management profile; and
   apply the set of parameters to the particular group of subscribers to weight the total throughput objective function and the QoE objective function.

12. The SON of claim 11, wherein the at least one server is further configured to:
   determine the set of parameters based on key performance indicators (KPIs) collected from subscriber devices and base stations associated with the SON at one or more of a service level, a system level, and a network level.

13. The SON of claim 10, wherein the at least one server is further configured to:
   quantitatively construct the QoE objective function by use of quality of service (QoS) parameters mapped to QoE parameters according to:

$QoE = \alpha Exp(-\beta QoS) + \gamma$, wherein $\alpha$, $\beta$, and $\gamma$ are service dependent QoS parameters, and wherein $\alpha$, $\beta$, and $\gamma$ represent packet delay budget, packet error loss rate, and data rate, respectively.

14. The SON of claim 10, wherein the SON includes one of a long term evolution (LTE) network, an evolved universal mobile telecommunication system terrestrial radio access network (EUTRAN) network, and an LTE-Advanced network.

15. A self-organizing network (SON) controller for frequency and power resource allocation, wherein subscribers in the SON are segmented into a plurality of groups based on subscriber type, the SON controller comprising:
   a memory configured to store instructions; and
   a processor coupled to the memory, wherein the processor is configured to execute a resource allocation application in conjunction with the instructions stored in the memory, and wherein the resource allocation application is configured to:
   assign a priority level to each group of subscribers;
   optimize resources of the SON for a group of subscribers with a highest priority level, and assign the optimized resources to the group of subscribers with the highest priority level;
   optimize and assign remaining resources of the SON to one or more groups of subscribers with lower priority levels than the group with the highest priority level, wherein optimization of resources within a particular group of subscribers, which comprises the group of subscribers with the highest priority level or the one or more groups with the lower priority levels, is modeled as a multi-objective optimization based on a total throughput objective of the particular group of subscribers and a quality of experience (QoE) objective of each subscriber in the particular group of subscribers; and
   combine the total throughput objective and the QoE objective as an aggregate objective function (AOF), wherein the AOF is weighted based on parameters obtained from one or more group policies for the particular group of subscribers.

16. The SON controller of claim 15, wherein the AOF includes one of a linear weighted sum objective function, a weighted exponential sum function, a lexicographic function, and a Tchebycheff function.

17. The SON controller of claim 15, wherein, to optimize the resources of the SON or the remaining resources of the SON, the resource allocation application is configured to:
   schedule one or more of sub-carrier frequencies and power levels; and
   dynamically portion a cell surface into distinct geographic regions.

18. The SON controller of claim 15, wherein the resource allocation application is further configured to:
   determine the frequency and power resource allocation based on application of a non-dominated sorting genetic algorithm (NSGA) to the AOF.

19. The SON controller of claim 15, wherein the resource allocation application is further configured to:
   apply a set of parameters to the particular group of subscribers to weight the total throughput objective and the QoE objective.

20. The SON controller of claim 19, wherein the resource allocation application is further configured to:
   quantitatively construct the QoE objective based on a map between quality of service (QoS) parameters and QoE parameters.

21. The SON controller of claim 20, wherein the map between the QoS parameters and the QoE parameters is based on:

$QoE = \alpha Exp(-\beta QoS) + \gamma$, wherein α, β, and γ are service dependent QoS parameters, and QoS is a real number representative of a determined value of a QoS class of service, and wherein α, β, and γ represent packet delay budget, packet error loss rate, and data rate, respectively.

22. The SON controller of claim 19, wherein the resource allocation application is further configured to:
  determine the set of parameters based on key performance indicators (KPIs) collected from subscriber devices and base stations associated with the SON; and
  collect the KPIs and quality of service (QoS) parameters at one or more of a service level, a system level, and a network level.

23. The SON controller of claim 22, wherein the QoS parameters collected at the service level for a video application include one or more of a video frame rate, a response time, and a peak signal to noise ratio (PSNR), and wherein the QoS parameters collected at the system level and the network level for the video application include one or more of a burst delay, a gap density, a packet loss, a bandwidth, a video bit rate, and an instantaneous throughput speed.

* * * * *